(12) United States Patent
Boczek

(10) Patent No.: US 9,364,923 B2
(45) Date of Patent: Jun. 14, 2016

(54) METHOD FOR THE PRODUCTION OF A PISTON

(71) Applicant: Mahle International GmbH, Stuttgart (DE)

(72) Inventor: Sascha-Oliver Boczek, Dielheim (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/542,218

(22) Filed: Nov. 14, 2014

(65) Prior Publication Data

US 2015/0060526 A1 Mar. 5, 2015

Related U.S. Application Data

(62) Division of application No. 13/243,143, filed on Sep. 23, 2011, now Pat. No. 9,108,274.

(30) Foreign Application Priority Data

May 5, 2011 (DE) .......................... 10 2011 075 300

(51) Int. Cl.
  *B23K 31/02* (2006.01)
  (Continued)

(52) U.S. Cl.
  CPC ............ *B23K 37/0435* (2013.01); *B23K 20/129* (2013.01); *B23K 37/053* (2013.01); *B23P 15/10* (2013.01); *F02F 3/003* (2013.01); *F02F 3/22* (2013.01); *F02F 2003/0061* (2013.01)

(58) Field of Classification Search
  CPC . F02F 3/003; F02F 2003/0061; F02F 3/0076; B23K 20/129; B23K 37/0435; B23K 37/053
  See application file for complete search history.

(56) References Cited

U.S. PATENT DOCUMENTS 3,070,079 A * 12/1962 Seifert ..................... F01M 1/04
                                                          123/41.36
4,907,545 A * 3/1990 Mills .................. B22D 19/0027
                                                          123/193.6
6,032,619 A    3/2000 Zhu et al.

FOREIGN PATENT DOCUMENTS

DE        69917904 T3    5/2007
DE     102008034430 A1   5/2010
(Continued)

OTHER PUBLICATIONS

English abstract provided for DE-102008034430.
English abstract for EP-1876344.
English abstract for JP-56-124650.

*Primary Examiner* — Erin Saad
(74) *Attorney, Agent, or Firm* — Fishman Stewart PLLC

(57) ABSTRACT

The present invention relates to a method for the production of a piston (1), composed of a piston upper part (2) and a piston lower part (3), of an internal combustion engine, in which the piston upper part (2) is welded with the piston lower part (3) via a contact surface (4) and thereby a cooling duct (5), delimited therebetween, is formed. It is essential to the invention here that for the production or keeping free of an net opening (6) and/or of an outlet opening (7) of the cooling duct (5) during or immediately after the welding of the piston upper part (2) with the piston lower part (3) at least one pin (8) is held out from the piston lower part (3) in the cooling duct (5) or is pushed therein and is drawn out again after the welding process, so that a welding bead (9) occurring on the welding process does not constrict a cross-section of the net opening (6) and/or of the outlet opening (7). Hereby, the piston (1) can be produced at a comparatively favorable cost.

20 Claims, 2 Drawing Sheets

(51) Int. Cl.
  *B23K 37/04* (2006.01)
  *B23P 15/10* (2006.01)
  *F02F 3/00* (2006.01)
  *F02F 3/22* (2006.01)
  *B23K 37/053* (2006.01)
  *B23K 20/12* (2006.01)

(56) References Cited

FOREIGN PATENT DOCUMENTS

EP  1876344 B1  3/2011
GB  1096826 A  12/1967
JP  56-124650 A  9/1981

* cited by examiner

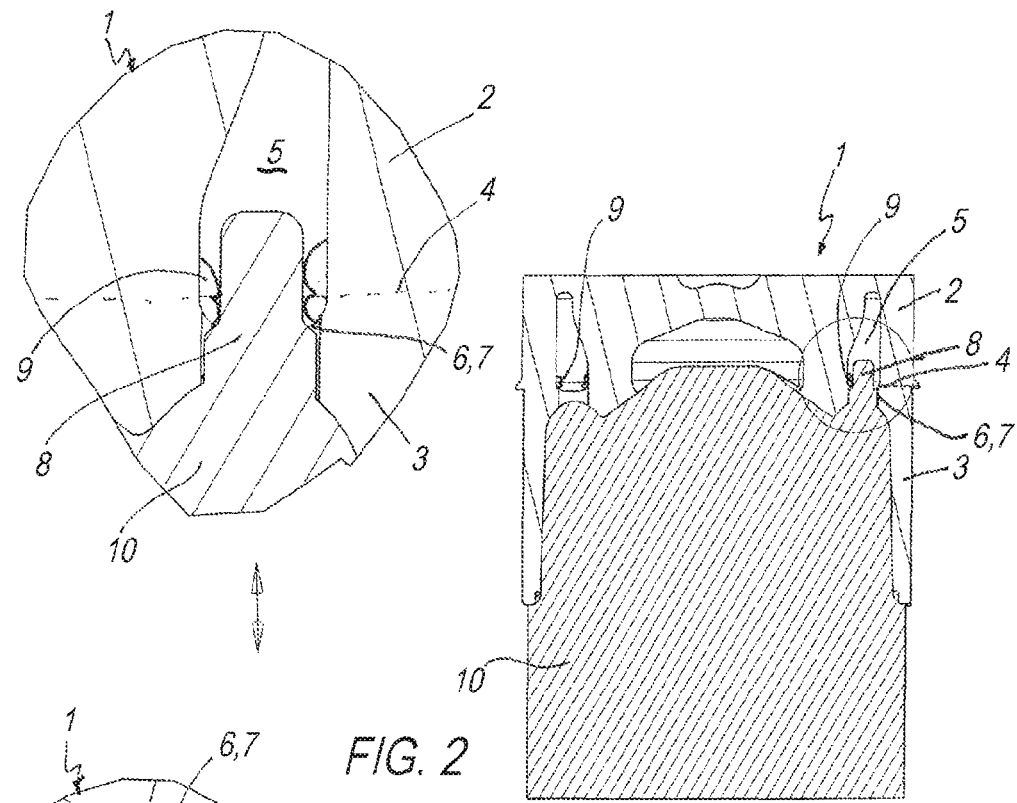
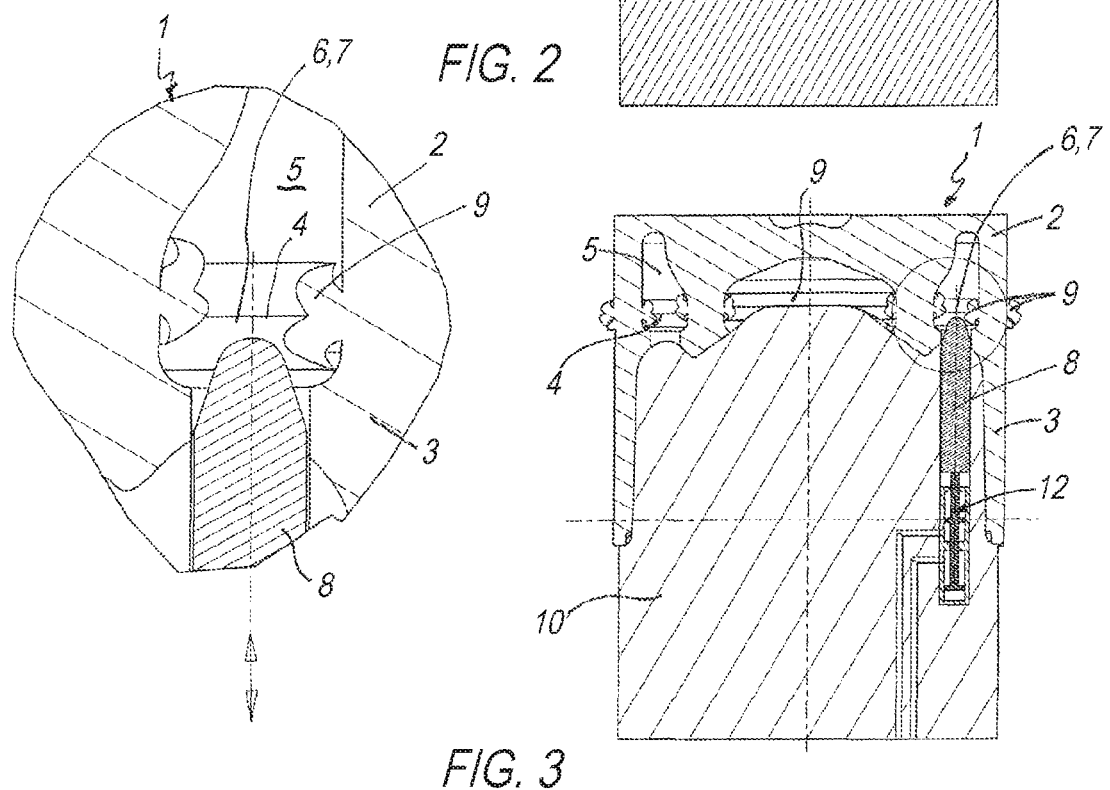
FIG. 2
FIG. 3

METHOD FOR THE PRODUCTION OF A PISTON

CROSS-REFERENCES TO RELATED APPLICATION

This application is a divisional application of U.S. patent application Ser. No. 13/243,143, filed on Sep. 23, 2011, which claims priority to German Patent Application DE 102011075300, filed May 5, 2011. The contents of both these applications are hereby incorporated by reference in their entirety.

TECHNICAL FIELD

The present invention relates to a method for the production of a piston composed of a piston upper part and a piston lower part. In addition, the invention relates to a piston produced according to such a method and a clamping/welding device to carry out the method according to the invention.

BACKGROUND

From DE 10 2008 034 430 A1 a generic method is known for the production of a piston composed of a piston upper part and a piston lower part of an internal combustion engine, in which the piston upper part is welded via a contact surface with the piston lower part and thereby a cooling duct is formed which is situated therebetween. To introduce a coolant into the cooling duct, a flow tube which is inserted into the piston lower part and projects from a cooling channel base is arranged in an inlet opening, the opening of which flow tube is arranged above welding beads of the friction-welded connection. In this installation position, the flow tube is fixed in position in the region of the contact geometry on both sides partially by the welding beads which occur during the friction-welded connection. The flow tube which is inserted remains in the piston after the production of the friction-welded connection and ensures an unrestricted cross-section in the region of the inlet opening.

SUMMARY

A disadvantage from the prior art is that to keep the inlet opening free, firstly the flow tube which is able to be inserted into the piston lower part must be mounted and adjusted, resulting in assembly costs which are not to be underestimated. At the same time, the flow tube, which of course can also be positioned in the same way in an outlet opening of the cooling duct, requires storage and logistics expenses which are not to be underestimated.

The present invention therefore deals with the problem of providing an improved or at least an alternative embodiment for a method of the generic type, which in particular makes possible a simpler and more favourably priced production of a piston composed of a piston upper part and a piston lower part.

This problem is solved according to the invention by the subject matter of the independent claims. Advantageous embodiments are the subject matter of the dependent claims.

The present invention is based on the general idea, for keeping free an inlet opening and/or an outlet opening of a cooling duct of a piston, delimited by a piston lower part and a piston upper part, not as known from the prior art of providing a flow tube remaining in the piston, but rather a pin, which during or immediately after the welding of the piston upper part with the piston lower part is held out from the latter in the cooling duct or is pushed therein, and after completion of the welding process is withdrawn therefrom again, so that a welding bead occurring during the welding process does not constrict a cross-section of the inlet opening and/or of the outlet opening. The pin is either connected securely here according to the invention with a clamping jaw holding the piston lower part, or is mounted adjustably thereon, so that after completion of the welding process the pin is in all cases withdrawn from the inlet opening or respectively from the outlet opening again and thereby exclusively the opening itself remains in the piston. The piston is composed here in a known manner from a piston lower part and a piston upper part, wherein the piston upper part is welded with the piston lower part via a contact surface, in particular is friction-welded, and thereby a cooling channel can be formed which is delimited therebetween. By the method according to the invention, in particular the necessary mounting of a flow tube in the piston lower part before the actual welding process can be dispensed with, whereby the assembly costs can be reduced and thereby the piston can be produced at a more favourable cost. By the omission of the flow tube which was necessary hitherto, the costs for this are also dispensed with, in particular the production, storage and logistics costs, which likewise reduces the price of the piston according to the invention, compared with pistons known from the prior art.

In an advantageous further development of the solution according to the invention, the at least one pin is securely connected with a first clamping jaw, holding the piston lower part during the welding process, and can be moved exclusively together therewith. In this special embodiment, the piston lower part is clamped in the first clamping jaw, wherein the at least one pin already projects through the inlet opening and/or outlet opening into the cooling duct. The projecting of the at least one pin into the cooling duct extends here at least up to the height of the welding beads which occur in the friction-welded connection. The piston upper part is now clamped in the second clamping jaw, wherein the first and the second clamping jaws are part of a clamping/welding device. The actual friction-welding process now begins, in which the two clamping jaws are pressed against each other and rotated. The welding beads, spreading out inwardly here into the cooling duct, are braked by the at least one pin in their further spreading process and, owing to the geometry of the at least one pin, are pressed against the walls of the cooling duct. After completion of the friction-welding process, the clamping/welding device opens, by the two clamping jaws moving apart, whereupon the welded piston can be removed. On removal of the piston, the pin which is connected securely with the first clamping jaw of the clamping device is drawn out here from the inlet opening and/or the outlet opening, without its cross-section reducing in the process.

In an alternative embodiment of the method according to the invention, the at least one pin is arranged adjustably on the first clamping jaw of the clamping/welding device and in addition is adjustable hydraulically, pneumatically or electrically and independently of the first clamping jaw. For this a, preferably hydraulic, adjustment device is provided on the first clamping jaw, for adjusting the at least one pin. The method begins again here such that the piston lower part is clamped into the first clamping jaw and the piston upper part is clamped into the associated second clamping jaw of the clamping/welding device. The friction-welding process now begins, in which the piston upper part is pressed via its contact surface against the piston lower part and in so doing is rotated. After the rotation stop, the respective friction-welded regions on the contact surface are still so hot that they are deformable, whereupon the at least one pin is moved out by means of the adjustment device and in so doing presses aside the welding beads in the region of the inlet opening and/or the outlet opening. Thereafter, the pin moves back into its initial position into the first clamping jaw, whereupon the clamping/welding device opens and the welded piston can be removed. In this embodiment also it can be guaranteed in a simple and favourably priced manner that a cross-section of the inlet/outlet opening is kept free.

In a further advantageous embodiment of the solution according to the invention, the at least one pin tapers towards its free end and thereby creates in particular a conical cross-section for keeping free. However, in so doing, the tapering pin not only creates a conical cross-section for keeping free, but also, owing to its shape, facilitates a removal of the piston lower part from the first clamping jaw or respectively a moving back of the pin by means of the adjustment device. Of course, other shapes of the pin are also conceivable. Furthermore, a special choice of material for the pin or a coating thereof is also conceivable, which in particular promote the pressing away of the welding beads and/or the drawing out of the pin.

Further important features and advantages of the invention will emerge from the subclaims, from the drawings and from the associated description of figures with the aid of the drawings.

It is to be understood that the features mentioned above and to be explained below are able to be used not only in the respectively indicated combination, but also in other combinations or in isolation, without departing from the scope of the present invention.

Preferred example embodiments of the invention are represented in the drawings and are explained in further detail in the following description, wherein identical reference numbers refer to identical or similar or functionally identical components.

BRIEF DESCRIPTION OF THE DRAWINGS

There are shown, diagrammatically respectively.

DETAILED DESCRIPTION

Figure 1:
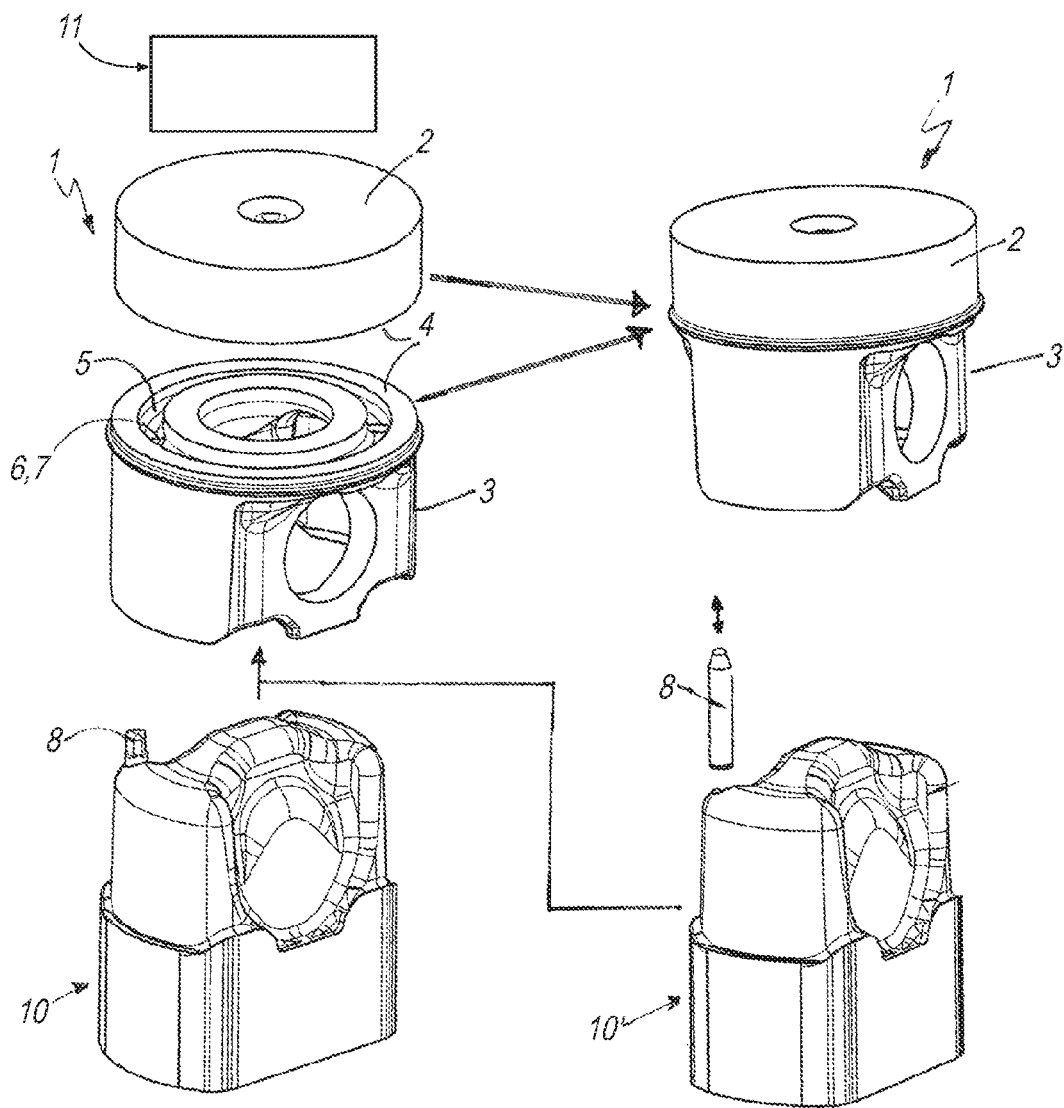
FIG. 1 a piston according to the invention, composed of a piston upper part and a piston lower part, with associated first clamping jaw of a clamping/welding device,
FIG. 2 a sectional representation through a first embodiment of the first clamping jaw with piston fitted,
FIG. 3 a representation as in FIG. 2, but in a different embodiment of the first clamping jaw.

In accordance with FIG. 1, a piston 1 according to the invention is composed of a piston upper part 2 and a piston lower part 3, which are welded together via a contact surface 4, in particular are connected with each other via a friction-welded connection. As can be seen here in particular also from FIGS. 2 and 3, through the piston upper part 2 and the piston lower part 3, a cooling duct 5, lying therebetween, is formed or respectively delimited. For the production or keeping free at least of one inlet opening 6 and/or outlet opening 7 of the cooling duct 5 during or immediately after the welding of the piston upper part 2 with the piston lower part 3, at least one pin 8 is held out from the piston lower part 3 in the cooling duct 5 or is inserted therein, and is drawn out again after the welding process, so that a welding bead 9, occurring during the welding process, does not restrict a cross-section of the inlet opening 6 and/or of the outlet opening 7, i.e. does not constrict it.

Basically, two different methods can be applied here, in which two different first clamping jaws 10, 10' are used, via which the piston lower part 3 is held during the production of the friction-welded connection. In the first variant of the clamping jaw 10, the pin 8 is securely connected with the first clamping jaw 10 and can therefore be connected exclusively together with the first clamping jaw 10 (cf. also FIG. 2). In the second variant of the first clamping jaw 10', the at least one pin 8 is adjustable via an adjustment device 12 hydraulically, pneumatically or electrically and can thereby be moved independently of the first clamping jaw 10' (cf. FIG. 3).

The first clamping jaw 10, 10' is part here of a clamping/welding device according to the invention, which is otherwise not shown, which additionally has a second clamping jaw 11 for holding the piston upper part 2, wherein the two clamping jaws are able to be pressed against each other and in this state are able to be rotated with respect to each other for the production of the friction-welded connection.

The manufacturing of the piston 1 according to the invention takes place here in accordance with the first method variant as follows:

Firstly the piston lower part 3 is clamped in the first clamping jaw 10, whereas the piston upper part 2 is clamped in the second clamping jaw 11, shown as a schematic block representation and lying opposite, of the clamping/welding device. On clamping of the piston lower part 3 onto the first clamping jaw 10, the pin 8, which is constructed integrally with the first clamping jaw 10, is already guided through the inlet opening or respectively outlet opening 6, 7. Subsequently, a moving onto each other takes place, and a rotating with respect to each other, exerted under pressure, of the two piston parts 2, 3, whereupon they the latter heat up greatly in their contact surface 4, such that a friction-welded connection is produced there. The welding beads 9 occurring during this are braked by the pin 8 in their spreading into the cooling duct 5 and in particular also into a cross-section of the inlet opening 6 or respectively of the outlet opening 7 and, owing to the geometry of the pin 8, are pressed against the walls of the cooling duct 5. After completion of the friction-welding process, the clamping/welding device according to the invention opens, by the two clamping jaws being pulled apart. During the subsequent drawing off of the piston lower part 3 from the first clamping jaw 10, the at least one pin 8 is drawn out from the inlet opening 6 or respectively from the outlet opening 7.

The manufacturing of the piston 1 according to the invention takes place here in accordance with the second method variant as follows:

Firstly, the piston lower part 3 is clamped on the first clamping jaw 10' and the piston upper part 2 is clamped on the second clamping jaw 11, which lies opposite and is shown as a schematic block representation. Subsequently, the production of the friction-welded connection takes place on the contact surface 4 in the usual manner After completion of the friction-welded connection, the friction-welded regions in the region of the contact surface are still so hot that they are deformable. At this moment, the hydraulically, pneumatically or electrically adjustable pin 8, having the geometry shown, moves out and pushes aside the welding beads 9, formed during the friction-welding process, at least in the region of the inlet opening 6 and/or of the outlet opening 7. Subsequently, the pin 8 is moved back into its initial position, whereupon the clamping/welding device opens and the piston lower part 3 can be removed from the first clamping jaw 10'.

Generally, the at least one pin 8 can taper here towards its free end, whereby in particular a pressing away of the welding beads 9 is facilitated with a movable pin 8, likewise a drawing out thereof at the end of the production process according to the invention. Of course, several pins 8 can be provided here on the first clamping jaw 10, 10', particularly when the piston lower part 3 has several inlet openings 6 and/or outlet openings 7. The most varied of materials, such as metal or ceramics, can be used here for the pin 8 itself.

With the method according to the invention, or respectively with the clamping/welding device according to the invention, in particular the cross-section of the at least one inlet opening 6 and/or of the at least one outlet opening 7 on the piston lower part 3 can be kept free, without separate flow tubes having to be kept available and installed for this. Hereby, the production process is not only simplified, but is also reduced in cost.

The invention claimed is:

1. A clamping device comprising: a first clamping jaw for holding a piston lower part and a second clamping jaw opposite of and adjacent to the first clamping jaw for holding a piston upper part, the piston upper part and the piston lower part forming a cooling duct defining at least one of an inlet opening and an outlet opening, and a welding bead disposed within the cooling duct at a region of the at least one of the inlet opening and the outlet opening;
    wherein the first clamping jaw is movable relative to the second clamping jaw such that the first clamping jaw is pressed against the second clamping jaw in a first position and the first clamping jaw is separated from the second clamping jaw in a second position;
    wherein the first clamping jaw includes at least one pin insertable into the at least one of the inlet opening and the outlet opening, and wherein the at least one pin is inserted from the first clamping jaw in the cooling duct when the first clamping jaw and the second clamping jaw are in the first position to deform the welding bead disposed within the cooling duct at the region of the at least one of the inlet opening and the outlet opening.

2. The clamping device according to claim 1, wherein the at least one pin is securely connected with the first clamping jaw holding the piston lower part during a welding process.

3. The clamping device according to claim 1, further comprising an adjustment device configured to extend and retract the at least one pin relative to the first clamping jaw at least when the first clamping jaw and the second clamping jaw are in the first position.

4. The clamping device according to claim 1, wherein the at least one pin is moveable by at least one of hydraulically, pneumatically and electrically, and independently of a first clamping jaw.

5. The clamping device according to claim 1, wherein the at least one of the inlet opening and the outlet opening is unobstructed.

6. The clamping device according to claim 1, wherein the at least one pin presses the welding bead against a wall of the cooling duct when the first clamping jaw and the second clamping jaw are in the first position.

7. The clamping device according to claim 1, wherein the at least one pin is tapered at a free end of the at least one pin defining a conical cross-section.

8. The clamping device according to claim 7, wherein the free end of the at least one pin presses the welding bead against a wall of the cooling duct when the first clamping jaw and the second clamping jaw are in the first position.

9. The clamping device according to claim 1, wherein the first clamping jaw includes at least two pins, a first pin insertable into the inlet opening and a second pin insertable into the outlet opening.

10. The clamping device according to claim 9, wherein at least one of the first pin and the second pin is securely connected with the first clamping jaw.

11. The clamping device according to claim 9, wherein at least one of the first pin and the second pin is adjustable independently of the first clamping jaw.

12. The clamping device according to claim 9, wherein the at least two pins respectively include an adjusting device configured to at least one of extend and retract the at least two pins at the piston lower part.

13. The clamping device according to claim 1, wherein the at least one pin extends into the cooling duct an extent at least commensurate with a position of the welding bead.

14. The clamping device according to claim 1, wherein the first clamping jaw is rotatable relative to the second clamping jaw at least in the first position.

15. A clamping device for a piston, comprising:
    a first clamping jaw for mounting a piston lower part and a second clamping jaw opposite the first clamping jaw for holding a piston upper part, the first clamping jaw being rotatable relative to the second clamping jaw, wherein the piston upper part and the piston lower part form an annular cooling duct defining at least one of an inlet opening and an outlet opening, and a welding bead disposed within the cooling duct in a region of at least one of the inlet opening and the outlet opening;
    at least one pin extending from the first clamping jaw configured to insert into at least one of the inlet opening and the outlet opening, the at least one pin being tapered at a free end defining a conical cross-section;
    wherein the free end of the at least one pin is extendable into the cooling duct via at least one of the inlet opening and the outlet opening an extent at least commensurate with a position of the welding bead.

16. The clamping device according to claim 15, wherein the at least one pin is arranged adjustably on the first clamping jaw, the at least one pin configured to extend and retract independently of the first clamping jaw.

17. The clamping device according to claim 15, wherein the at least one pin presses the welding bead against a wall of the cooling duct in a region corresponding to at least one of the inlet opening and the outlet opening.

18. A method for producing a piston, comprising:
    mounting a piston lower part via a clamping jaw, wherein the piston lower part includes a circumferential contact surface and at least one of an inlet opening and an outlet opening;
    clamping a piston upper part having a complementary circumferential contact surface on the piston lower part and abutting the respective contact surfaces together, wherein the piston lower part and the piston upper part delimit a cooling duct extending about a periphery of the piston, the cooling duct defining at least one of the inlet opening and the outlet opening;
    guiding at least one pin extending from the clamping jaw through at least one of the inlet opening and the outlet opening into the cooling duct; and
    welding the piston lower part to the piston upper part about the respective contact surfaces to form a connection via rotating the clamping jaw and the piston lower part relative to the piston upper part, wherein a welding bead resulting from welding the piston lower part to the piston upper part projects into the cooling duct at the connection in a region corresponding to at least one of the inlet opening and the outlet opening;
    wherein the at least one pin prevents the welding bead from obstructing at least one of the inlet opening and the outlet opening.

19. The method according to claim 18, wherein guiding the at least one pin includes extending the at least one pin into the cooling duct at least to a position of the connection, and pressing the welding bead via the at least one pin against a wall of the cooling duct at least one of during the step of welding the piston lower part to the piston upper part and after the step of welding the piston lower part to the piston upper part.

20. The method according to claim 18, wherein the clamping jaw is a first clamping jaw, and wherein clamping the piston upper part includes mounting the piston upper part in a second clamping jaw; and wherein welding the piston lower part with the piston upper part includes pressing the first clamping jaw against the second clamping jaw and rotating the first clamping jaw relative to the second clamping jaw to produce a friction-welded connection, and pressing the welding bead via the at least one pin against a wall of the cooling duct in the region corresponding to at least one of the inlet opening and the outlet opening.

\* \* \* \* \*